(12) United States Patent
Ichiguchi et al.

(10) Patent No.: US 9,201,819 B2
(45) Date of Patent: Dec. 1, 2015

(54) COMMAND PROCESSING APPARATUS, METHOD AND INTEGRATED CIRCUIT APPARATUS

(75) Inventors: Nobuyuki Ichiguchi, Osaka (JP); Tetsuji Mochida, Osaka (JP); Ryuta Nakanishi, Osaka (JP); Takaharu Tanaka, Osaka (JP)

(73) Assignee: SOCIONEXT INC., Kanagawa (JP)

( * ) Notice: Subject to any disclaimer, the term of this patent is extended or adjusted under 35 U.S.C. 154(b) by 1061 days.

(21) Appl. No.: 12/159,048

(22) PCT Filed: Jul. 28, 2006

(86) PCT No.: PCT/JP2006/315003
§ 371 (c)(1),
(2), (4) Date: Jun. 24, 2008

(87) PCT Pub. No.: WO2007/074555
PCT Pub. Date: Jul. 5, 2007

(65) Prior Publication Data
US 2009/0327571 A1    Dec. 31, 2009

(30) Foreign Application Priority Data
Dec. 26, 2005    (JP) .................. 2005-373296

(51) Int. Cl.
*G06F 12/06*    (2006.01)
*G06F 13/16*    (2006.01)
*G09G 5/00*    (2006.01)

(52) U.S. Cl.
CPC ............ *G06F 13/1605* (2013.01); *G09G 5/001* (2013.01)

(58) Field of Classification Search
CPC ........................... G06F 13/1605; G09G 5/001
USPC ................. 711/5, 149; 345/530, 540, 559
See application file for complete search history.

(56) References Cited

U.S. PATENT DOCUMENTS 4,677,544 A * 6/1987 Kinoshita ..................... 713/600
5,291,580 A * 3/1994 Bowden et al. ............... 711/5
(Continued)

FOREIGN PATENT DOCUMENTS

| JP | 63-40954 | 2/1988 |
| JP | 8-65686 | 3/1996 |

(Continued)

OTHER PUBLICATIONS

English language Abstract of JP 2000-315173, Nov. 14, 2000.
(Continued)

*Primary Examiner* — Cheng-Yuan Tseng
*Assistant Examiner* — Ramon A Mercado
(74) *Attorney, Agent, or Firm* — Greenblum & Bernstein, P.L.C.

(57) ABSTRACT

A command processing apparatus and method are provided for optimally processing commands issued asynchronously from a plurality of masters to a storage apparatus including a plurality of banks, where each master issues commands for a bank 0 and a bank 1 alternately. The command processing apparatus includes buffer units that obtain commands issued from the plurality of masters, an arbitration unit that arbitrates the obtained commands, and an issuance unit that issues commands to the storage apparatus according to the arbitration. The arbitration unit reads the commands of the plurality of masters obtained in the buffer units, and selects one command as a result of arbitration. The arbitration unit waits until a next command of a master relating to the selected command becomes readable, and reads the next command. The issuance unit consecutively issues the selected command and the read command to the storage apparatus.

20 Claims, 8 Drawing Sheets

(56) References Cited

U.S. PATENT DOCUMENTS

| | | | |
|---|---|---|---|
| 5,559,990 A * | 9/1996 | Cheng et al. | 711/157 |
| 5,630,098 A * | 5/1997 | Vermeer et al. | 711/172 |
| 5,729,709 A * | 3/1998 | Harness | 711/5 |
| 5,880,786 A | 3/1999 | Oku et al. | |
| 5,924,111 A * | 7/1999 | Huang et al. | 711/5 |
| 6,032,232 A * | 2/2000 | Lindeborg et al. | 711/149 |
| 6,321,310 B1 * | 11/2001 | McCarthy et al. | 711/154 |
| 6,366,989 B1 * | 4/2002 | Keskar et al. | 711/167 |
| 6,505,269 B1 * | 1/2003 | Potter | 711/202 |
| 7,562,184 B2 * | 7/2009 | Henmi et al. | 711/105 |
| 7,613,866 B2 * | 11/2009 | Niggemeier et al. | 711/5 |
| 2006/0004955 A1 * | 1/2006 | Ware et al. | 711/106 |
| 2007/0167168 A1 | 7/2007 | Fukumachi et al. | |
| 2007/0208919 A1 | 9/2007 | Tanaka et al. | |
| 2008/0086621 A1 | 4/2008 | Ogura | |

FOREIGN PATENT DOCUMENTS

| | | |
|---|---|---|
| JP | 2000-315173 | 11/2000 |
| JP | 2000-330866 | 11/2000 |

OTHER PUBLICATIONS

English language Abstract of JP 2000-330866, Nov. 30, 2000.
English language Abstract of JP 63-40954, Feb. 22, 1988.
English language Abstract of JP 8-65686, Mar. 8, 1996.

\* cited by examiner

FIG. 8

|        | First access | Second access | Third access | Fourth access |
|--------|--------------|---------------|--------------|---------------|
| Case 1 | Bank 1 | Bank 0 | Bank 1 | Bank 0 |
| Case 2 | Bank 0 | Bank 1 | Bank 0 | Bank 1 |
| Case 3 | Bank 0 | Bank 0 | Bank 1 | Bank 0 |
| Case 4 | Bank 1 | Bank 1 | Bank 0 | Bank 1 |
| Case 5 | Bank 1 | Bank 0 | Bank 1 | Bank 1 |
| Case 6 | Bank 0 | Bank 1 | Bank 0 | Bank 0 |
| Case 7 | Bank 0 | Bank 0 | Bank 1 | Bank 1 |
| Case 8 | Bank 1 | Bank 1 | Bank 0 | Bank 0 |

COMMAND PROCESSING APPARATUS, METHOD AND INTEGRATED CIRCUIT APPARATUS

TECHNICAL FIELD

The present invention relates to a command processing apparatus that processes commands which are issued asynchronously from a plurality of masters to a storage apparatus including a plurality of banks.

BACKGROUND ART

Conventionally, in the case of performing access to a storage apparatus including a plurality of banks, there is a known technique of distributing data between the plurality of banks and alternately accessing different banks so as to conceal a switching time required for a row address change (for example, see Patent Reference 1).

The following describes an image decoding apparatus disclosed in Patent Reference 1.

FIG. 1 shows a mapping example of image data on a memory of the conventional image decoding apparatus, where an encoded data buffer area, a frame memory 1, a frame memory 2, and a frame memory 3 are each distributed between two banks of a bank 0 and a bank 1. Each of the frame memories is made up of an area for a luminance signal and an area for a chrominance signal.

FIG. 2 shows an operation transition pattern in a memory control method of the conventional image decoding apparatus. As shown in FIG. 2, access to the encoded data buffer area and the frame memories 1 to 3 is performed by alternately accessing the bank 0 and the bank 1. Meanwhile, a row address change is performed in such a manner that a row address for the bank 0 is changed during a time period of immediately preceding access to the bank 1. By doing so, a wait time associated with a row address change can be concealed.

For instance, such a memory control operation that alternately accesses different banks is carried out under management of a single master apparatus, and maintained even between different types of access such as (a) a display image data read, (b) a reference image data read, (c) an encoded data read, (d) an encoded data write, and (e) a decoded image data write. Patent Reference 1: Japanese Unexamined Patent Application Publication No. 08-65686

DISCLOSURE OF INVENTION

Problems that Invention is to Solve

However, in the case where these different types of access are asynchronously performed by, for example, different master apparatuses and there is a possibility of contention, the above conventional image decoding apparatus cannot necessarily access the bank 0 and the bank 1 alternately. This causes a problem of being unable to conceal a wait time associated with a row address change.

The present invention has been developed to solve the above conventional problem, and has an object of providing a command processing apparatus that can alternately access the bank 0 and the bank 1 even when the above different types of access contend with each other.

Means to Solve the Problems

To achieve the stated object, a command processing apparatus according to the present invention is a command processing apparatus that sequentially processes a plurality of commands which are issued asynchronously from a plurality of masters to a storage apparatus, the storage apparatus including a plurality of banks, the command processing apparatus including: an arbitration unit that, when selecting a first command issued from one of the plurality of masters, further selects, following the first command, a second command that relates to the one of the plurality of masters and is for accessing a bank different from a bank accessed by the first command, and subsequently selects a third command issued from another one of the plurality of masters; and an issuance unit that consecutively issues the first command and the second command selected by the arbitration unit, to the storage apparatus.

Here, luminance data of an image and chrominance data of the image may be stored in the different banks which are consecutively accessed. Also, color component data and transparency data of graphics data and stencil data and depth data of the graphics data may be stored in the different banks which are consecutively accessed.

According to the above structure, commands for accessing different banks are consecutively selected and issued. This prevents a situation where commands for accessing a same bank are consecutively issued. As a result, after accessing one bank, a change to a row address to be accessed next in that bank can be made during access to another bank. Hence a command processing apparatus that can access data with a high throughput by unfailingly concealing a switching time required to change a row address in a same bank can be realized.

Here, in the case where each of the plurality of masters issues a command for accessing a bank different from a bank accessed by an immediately preceding command issued by the master, the arbitration unit may, when selecting a command issued from one of the plurality of masters, wait until a next command is obtained from the one of the plurality of masters, and select the next command.

According to the above structure, consecutive access to a same bank can be avoided.

Here, in the case where each of the plurality of masters places data to be consecutively accessed, in areas of different banks, the areas being associated with each other according to a predetermined rule, the arbitration unit may, when selecting a command issued from one of the plurality of masters, generate a command for accessing an area of another bank that is associated with an area of a bank accessed by the selected command according to the predetermined rule, and select the generated command.

According to the above structure, in addition to the avoidance of consecutive access to a same bank, an effect of reducing a command issuance load of a master can be attained.

Here, each of the plurality of masters may output, when issuing a command, an indication signal together with the command, the indication signal indicating whether or not the master issues, following the command, another command for accessing a bank different from a bank accessed by the command, wherein the arbitration unit, when selecting a command issued from one of the plurality of masters, waits until a next command is obtained from the one of the plurality of masters, and selects the next command, only in a case where an indication signal outputted together with the selected command indicates that the one of the plurality of masters issues, following the command, another command for accessing a bank different from a bank accessed by the command.

According to the above structure, in the case when a next command for accessing a different bank is not issued from a master, the arbitration unit can be saved from an inconvenience of waiting for such a command.

It should be noted that the present invention can be realized not only as the above command processing apparatus, but also as an integrated circuit apparatus or a command processing method.

Effects of the Invention

With the command processing apparatus according to the present invention, commands for accessing different banks are consecutively selected and issued, so that a situation where commands for accessing a same bank are consecutively issued can be prevented.

Therefore, after accessing one bank, a change to a row address to be accessed next in that bank can be made during access to another bank. This makes it possible to realize a command processing apparatus that can access data with a high throughput by unfailingly concealing a switching time required to change a row address in a same bank.

BRIEF DESCRIPTION OF DRAWINGS

FIG. 8 shows one example of combinations of banks corresponding to commands which are issued by the command processing apparatus in the third embodiment.

NUMERICAL REFERENCES

Figure 1:
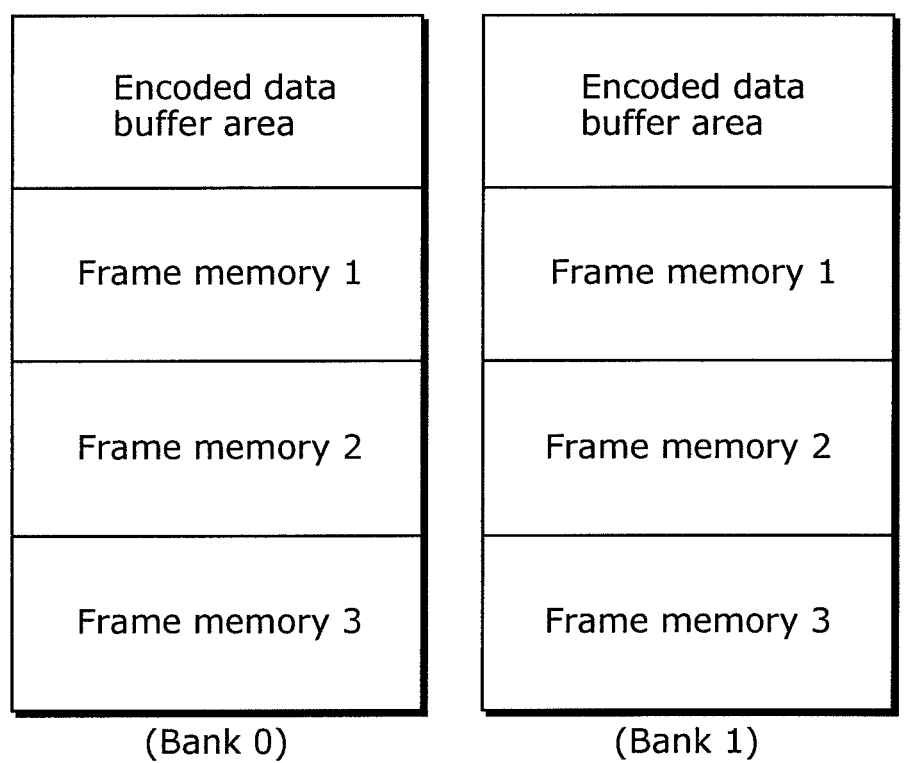
FIG. 1 shows a mapping example of image data on a memory of an image decoding apparatus according to a conventional technique.
Figure 2:
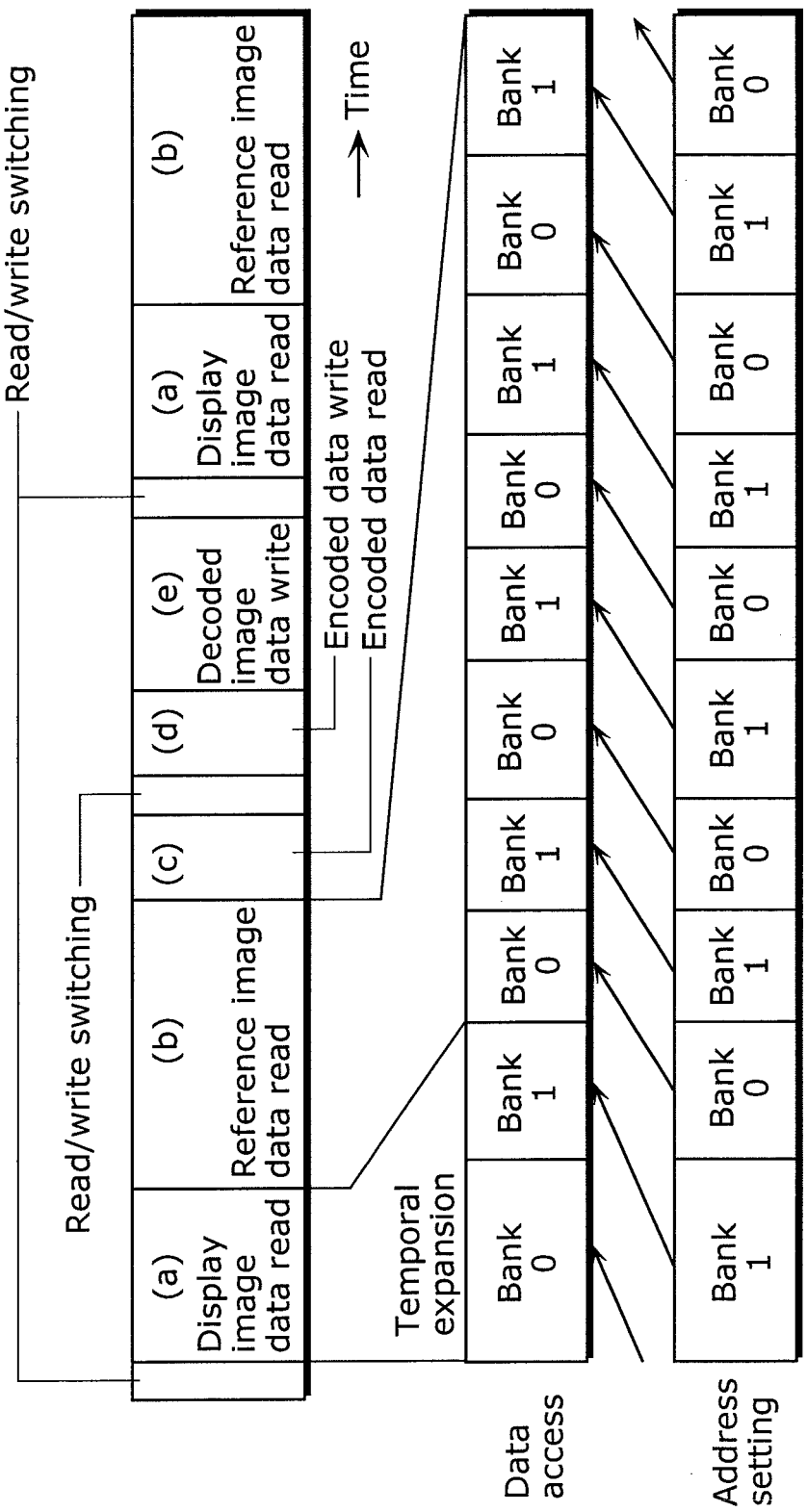
FIG. 2 shows an operation transition pattern in a memory control method of an image decoding apparatus according to the conventional technique.

300 Master A
301 Master B
302 Master C
303, 304, 305 Buffer unit
306 Arbitration unit
307 Issuance unit
308 Storage apparatus
309 Command processing apparatus
600 Master A
601 Master B
602 Master C
603, 604, 605 Buffer unit
606 Arbitration unit
607 Issuance unit
608 Storage apparatus
609 to 614 Consecutive selection request signal
615 Command processing apparatus

BEST MODE FOR CARRYING OUT THE INVENTION

The following describes embodiments of the present invention with reference to drawings.

First Embodiment

Figure 3:
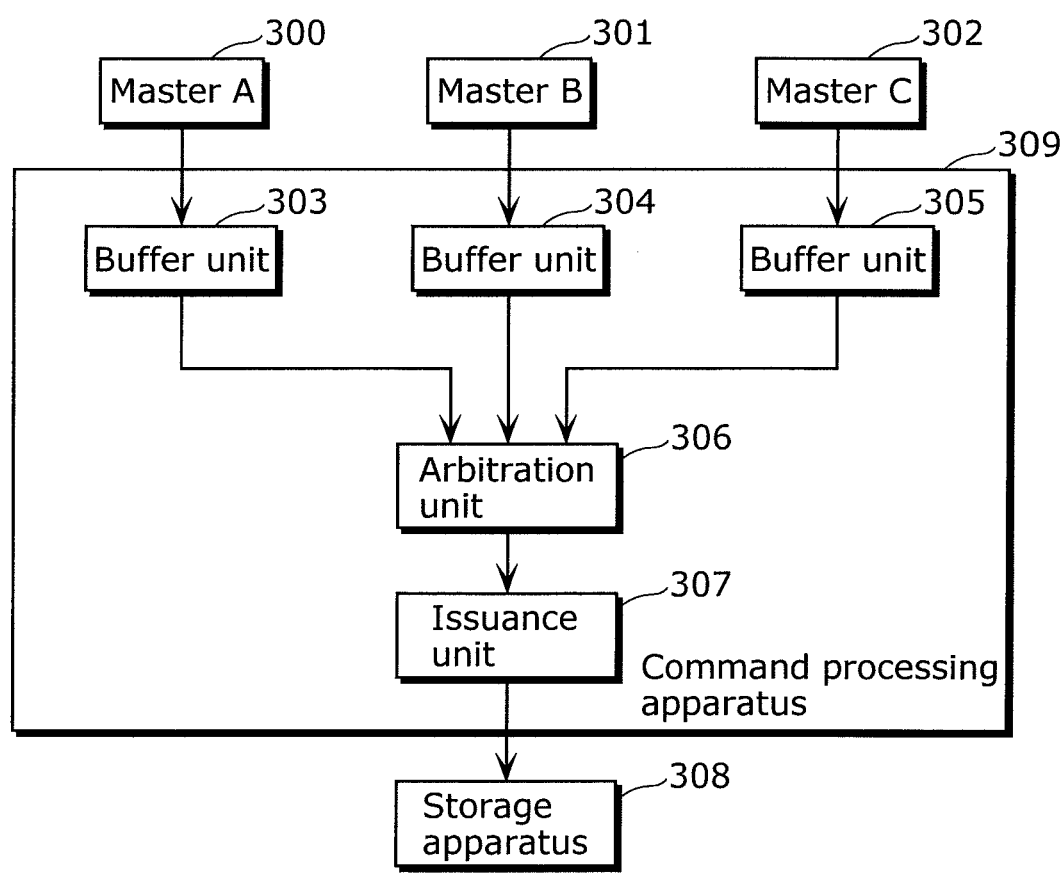
FIG. 3 is a block diagram showing one example of a functional structure of a command processing apparatus in a first embodiment.

FIG. 3 is a block diagram showing one example of a functional structure of a command processing apparatus 309 in a first embodiment. The command processing apparatus 309 is a command processing apparatus that processes commands which are issued asynchronously from a master A 300, a master B 301, and a master C 302 to a storage apparatus 308 including a plurality of banks (for example, a bank 0 and a bank 1). The command processing apparatus 309 includes buffer units 303, 304, and 305, an arbitration unit 306, and an issuance unit 307.

Data to be accessed by each of the master A 300, the master B 301, and the master C 302 is distributed between the bank 0 and the bank 1 in the storage apparatus 308. When accessing the storage apparatus 308, each of the master A 300, the master B 301, and the master C 302 issues commands for the bank 0 and the bank 1 alternately, beginning at the bank 0 which is followed by the bank 1, the bank 0, and so on.

Here, as one typical example, luminance data of an image and chrominance data of the image may be placed respectively in the bank 0 and the bank 1 in the storage apparatus 308.

Also, as another typical example, color component data and transparency data (usually referred to as RGBα data) of graphics data and stencil data and depth data (usually referred to as SZ data) of the graphics data may be placed respectively in the bank 0 and the bank 1 in the storage apparatus 308.

The buffer units 303, 304, and 305 operate concurrently with each other, and respectively obtain commands which are issued asynchronously from the master A 300, the master B 301, and the master C 302.

Figure 4:
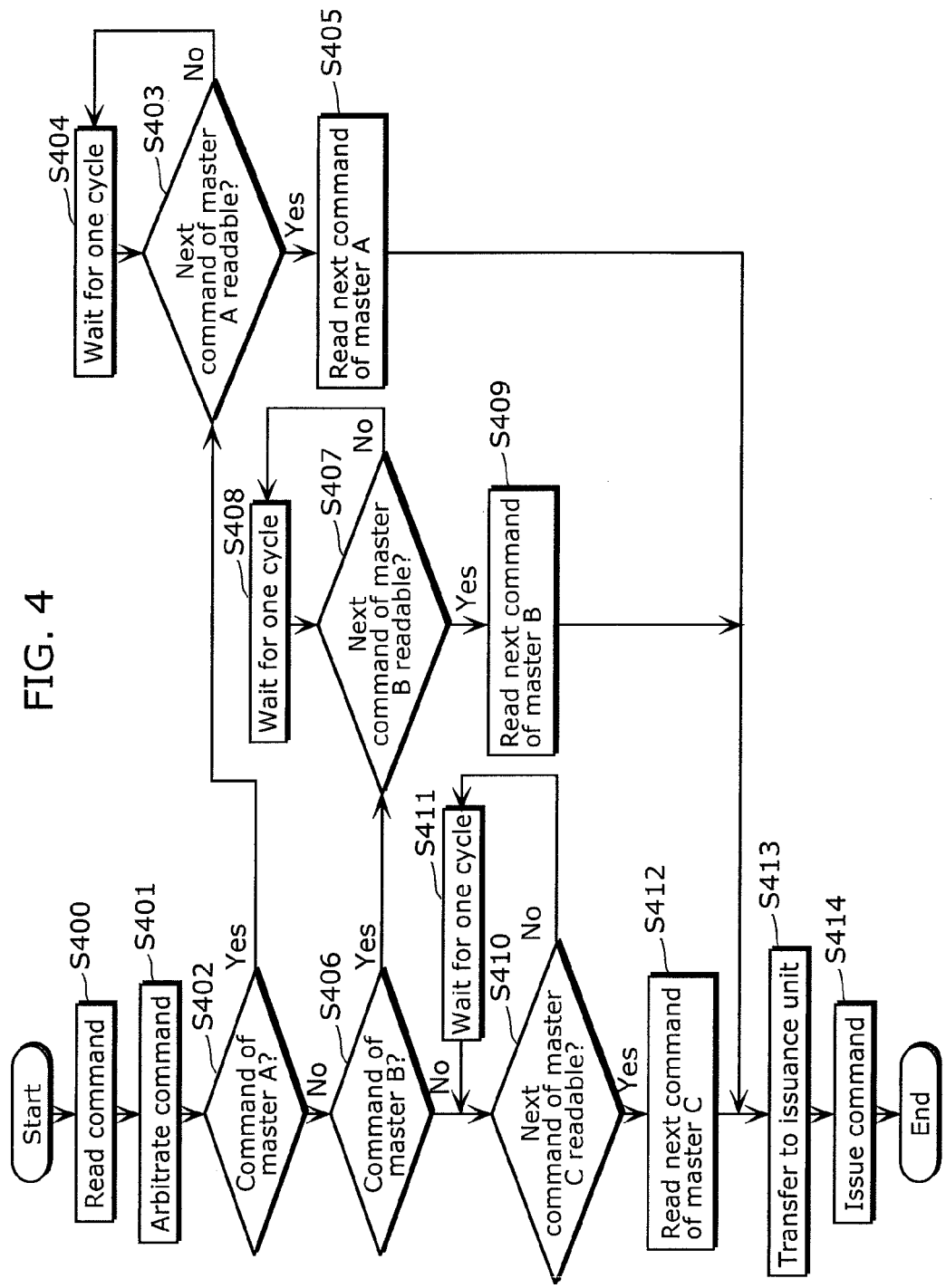
FIG. 4 is a flowchart showing an operation of the command processing apparatus in the first embodiment.

FIG. 4 is a flowchart showing command processing performed by the command processing apparatus 309 in the first embodiment.

This flowchart shows a procedure from when commands issued from the master A 300, the master B 301, and the master C 302 have been obtained respectively by the buffer units 303, 304, and 305 to when the commands are transferred to the storage apparatus 308.

The arbitration unit 306 reads the commands from the buffer units 303, 304, and 305 (S400), and arbitrates the read commands to thereby select a command relating to one master (S401). Though the present invention is not limited to a specific method for the arbitration, the arbitration may be performed according to a well-known round robin method as one example.

When the command of the master A 300 is selected as a result of the arbitration (S402: Yes), the arbitration unit 306 judges whether or not a next command of the master A 300 is readable (S403).

When the next command of the master A 300 is not readable (S403: No), the arbitration unit 306 waits for one cycle (S404). When the next command of the master A 300 is readable (S403: Yes), the arbitration unit 306 reads the next command of the master A 300 from the buffer unit 303 (S405).

When the command of the master B 301 is selected as a result of the arbitration (S406: Yes), the arbitration unit 306 judges whether or not a next command of the master B 301 is readable (S407).

When the next command of the master B 301 is not readable (S407: No), the arbitration unit 306 waits for one cycle (S408). When the next command of the master B 301 is readable (S407: Yes), the arbitration unit 306 reads the next command of the master B 301 from the buffer unit 304 (S409).

When neither the command of the master A 300 nor the command of the master B 301 but the command of the master C 302 is selected as a result of the arbitration (S406: No), the arbitration unit 306 judges whether or not a next command of the master C 302 is readable (S410).

When the next command of the master C 302 is not readable (S410: No), the arbitration unit 306 waits for one cycle (S411). When the next command of the master C 302 is readable (S410: Yes), the arbitration unit 306 reads the next command of the master C 302 from the buffer unit 305 (S412).

The arbitration unit 306 transfers the command selected as a result of the arbitration in command arbitration step S401 and the second command read in one of master A command reading step S405, master B command reading step S409, and master C command reading step S412, to the issuance unit 307 (S413). The issuance unit 307 issues the commands transferred from the arbitration unit 306, to the storage apparatus 308 (S414).

A specific example of an operation of the command processing apparatus in this embodiment with the above structure is described in detail below.

First, the master A 300, the master B 301, and the master C 302 asynchronously issue commands to the storage apparatus 308. The command issued by the master A 300 is temporarily stored in the buffer unit 303, the command issued by the master B 301 is temporarily stored in the buffer unit 304, and the command issued by the master C 302 is temporarily stored in the buffer unit 305.

The arbitration unit 306 reads the commands stored in the buffer units 303 to 305 in command reading step S400, and arbitrates the commands of the three masters in command arbitration step S401, thereby selecting a command of one master.

The judgment as to whether or not the selected command is a command of the master A 300 is made in master A command judgment step S402. When the selected command is a command of the master A 300, the operation proceeds to master A command readability judgment step S403 to judge whether or not a next command of the master A 300 is readable.

When the next command of the master A 300 is not readable, the operation proceeds to wait step S404 to wait for one cycle, and then proceeds again to master A command readability judgment step S403. Wait step S404 and master A command readability judgment step S403 are repeated until the next command of the master A 300 becomes readable.

When the next command of the master A 300 becomes readable in master A command readability judgment step S403, the operation proceeds to master A command reading step S405 to read the next command of the master A 300. The operation then proceeds to command transfer step S413, to transfer the two commands of the master A, namely, the command selected in command arbitration step S401 and the command read in master A command reading step S405, to the issuance unit 307.

The two commands transferred to the issuance unit 307 are consecutively issued to the storage apparatus 308 in command issuance step S414. Since the master A 300 issues commands for the bank 0 and the bank 1 alternately, the two commands of the master A, namely, the command selected in command arbitration step S400 and the command read in master A command reading step S405, are commands for different banks.

After the two commands of the master A, namely, the command selected in command arbitration step S400 and the command read in master A command reading step S405, are transferred to the issuance unit 307 in command transfer step S413, new arbitration is performed between commands of the three masters according to the procedure shown in FIG. 4 again, to select a next command.

The judgment as to whether or not the selected command is a command of the master A 300 is made in master A command judgment step S402. When the selected command is a command of the master B 301, that is, when the selected command is not a command of the master A 300, the operation proceeds to master B command judgment step S406. Since the selected command is a command of the master B 301, the operation proceeds to master B command readability judgment step S407 to judge whether or not a next command of the master B 301 is readable.

When the next command of the master B 301 is not readable, the operation proceeds to wait step S408 to wait for one cycle, and then proceeds again to master B command readability judgment step S407. When the next command of the master B 301 becomes readable, the operation proceeds to master B command reading step S409 to read the next command of the master B 301. The operation then proceeds to command transfer step S413, to transfer the two commands of the master B, namely, the command selected in command arbitration step S400 and the command read in master B command reading step S409, to the issuance unit 307.

The two commands transferred to the issuance unit 307 are consecutively issued to the storage apparatus 308 in command issuance step S414. Since the master B 301 issues commands for the bank 0 and the bank 1 alternately as with the master A 300, the two commands of the master B, namely, the command selected in command arbitration step S400 and the command read in master B command reading step S409, are commands for different banks.

Each of the master A 300, the master B 301, and the master C 302 alternately accesses the bank 0 and the bank 1, beginning at the bank 0 which is followed by the bank 1, the bank 0, and so on. This being so, when the commands of the master A and the commands of the master B are issued consecutively to the storage apparatus 308 in command issuance step S414, banks corresponding to the issued commands are in the order of the bank 0, the bank 1, the bank 0, the bank 1. Since the bank 0 and the bank 1 are alternately accessed in this way, a switching time required for a row address change can be concealed.

As described above, according to this embodiment, the arbitration unit 306 selects two commands consecutively issued from one of the master A 300, the master B 301, and the master C 302 that asynchronously issue commands alternately for the two banks of the bank 0 and the bank 1 in the storage apparatus 308, and the selected commands are consecutively issued to the storage apparatus 308. This allows a switching time required for a row address change to be concealed.

In the typical example mentioned earlier, the two consecutively selected commands are a command for accessing luminance data of an image and a command for accessing chrominance data of the image. In the other typical example mentioned earlier, the two consecutively selected commands are a command for accessing color component data and transparency data of graphics data and a command for accessing stencil data and depth data of the graphics data.

The first embodiment describes the case where the storage apparatus includes two banks and a command issued by each of the three masters corresponds to one bank. However, even in the case where the storage apparatus includes four banks and a command issued by each of the three masters corresponds to two banks, when a transfer size of one command to each bank is too small to conceal a switching time required for a row address change, the same effect as above can be achieved by consecutively selecting two commands, namely, a command for the bank 0 and the bank 1 and a command for a bank 2 and a bank 3, in the arbitration unit.

Second Embodiment

The following describes a command processing apparatus in a second embodiment. In the second embodiment, data to be consecutively accessed by each of the master A 300, the master B 301, and the master C 302 is distributed between the bank 0 and the bank 1 of the storage apparatus 308 so as to be placed in areas that are associated with each other according to a predetermined rule.

One typical example of such placement is that luminance data and chrominance data which relate to one pixel of an image are placed in areas that are at a same offset from a predetermined base address in the bank 0 and the bank 1, respectively. In the case where the luminance data and the chrominance data differ in density, different offsets reflecting a ratio in density between the luminance data and the chrominance data are used instead.

An address of data in the bank 1 to be accessed by the master A 300 can be calculated from an address of data allocated in the bank 0 for the master A 300, according to the above rule. Therefore, a command of the master A 300 for the bank 1 in the storage apparatus 308 can be generated from a command of the master A 300 for the bank 0 in the storage apparatus 308.

Likewise, an address of data in the bank 1 to be accessed by each of the master B 301 and the master C 302 can be calculated from an address of data allocated in the bank 0 for the master, according to the above rule. Therefore, a command of each of the master B 301 and the master C 302 for the bank 1 in the storage apparatus 308 can be generated from a command of the master for the bank 0 in the storage apparatus 308.

When accessing the storage apparatus 308, each of the master A 300, the master B 301, and the master C 302 issues only a command for the bank 0.

The command processing apparatus in the second embodiment has the same structure as the command processing apparatus in the first embodiment (see FIG. 3), but differs in that it generates a command for the bank 1 corresponding to a command for the bank 0, and consecutively issues the command for the bank 0 and the generated command for the bank 1.

An operation of the command processing apparatus in the second embodiment is described below.

Figure 5:
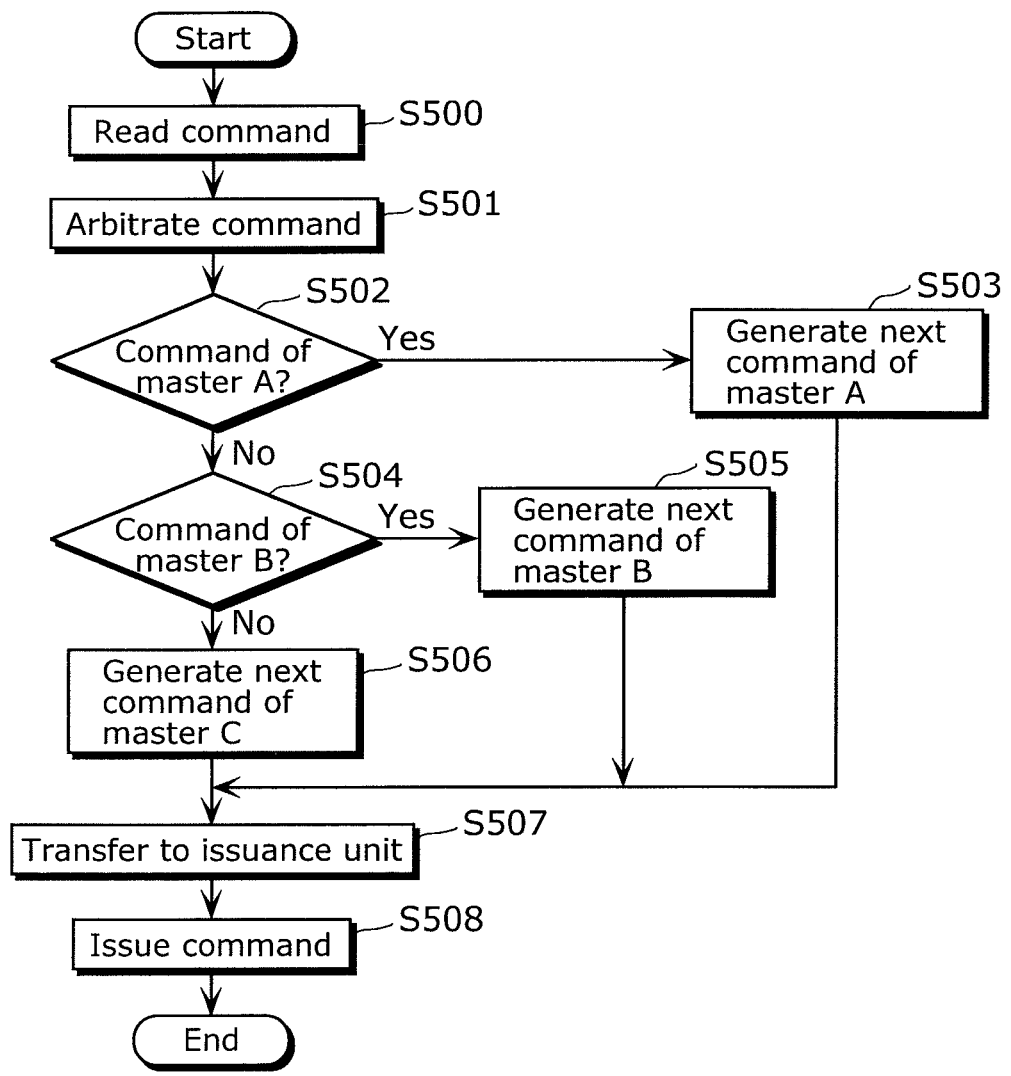
FIG. 5 is a flowchart showing an operation of a command processing apparatus in a second embodiment.

FIG. 5 is a flowchart showing command processing performed by the command processing apparatus 309 in the second embodiment.

This flowchart shows a procedure from when commands issued by the master A 300, the master B 301, and the master C 302 for the bank 0 have been obtained respectively by the buffer units 303, 304, and 305 to when the commands are transferred to the storage apparatus 308 together with commands generated by the arbitration unit 306 for the bank 1.

The arbitration unit 306 reads the commands from the buffer units 303, 304, and 305 (S500), and arbitrates the read commands to thereby select a command relating to one master (S501). Though the present invention is not limited to a specific method of the arbitration, the arbitration may be performed according to a well-known round robin method as one example.

When the command of the master A 300 is selected as a result of the arbitration (S502: Yes), the arbitration unit 306 generates a command of the master A 300 for the bank 1 (S503).

When the command of the master B 301 is selected as a result of the arbitration (S504: Yes), the arbitration unit 306 generates a command of the master B 301 for the bank 1 (S505).

When neither the command of the master A 300 nor the command of the master B 301 but the command of the master C 302 is selected as a result of the arbitration (S504: No), the arbitration unit 306 generates a command of the master C 302 for the bank 1 (S506).

The arbitration unit 306 transfers the command for the bank 0 selected as a result of the arbitration in command arbitration step S501 and the command for the bank 1 generated in one of master A command generation step S503, master B command generation step S505, and master C command generation step S506, to the issuance unit 307 (S507). The issuance unit 307 issues the commands transferred from the arbitration unit 306, to the storage apparatus 308 (S508).

A specific example of an operation of the command processing apparatus in this embodiment with the above structure is described in detail below.

First, the master A 300, the master B 301, and the master C 302 asynchronously issue commands for the bank 0 in the storage apparatus 308. The command issued by the master A 300 is temporarily stored in the buffer unit 303, the command issued by the master B 301 is temporarily stored in the buffer unit 304, and the command issued by the master C 302 is temporarily stored in the buffer unit 305.

The arbitration unit 306 reads the commands stored in the buffer units 303 to 305 in command reading step S500, and arbitrates the commands of the three masters in command arbitration step S501, thereby selecting a command of one master.

The judgment as to whether or not the selected command is a command of the master A 300 is made in master A command judgment step S502. When the selected command is a command of the master A 300, the operation proceeds to master A command generation step S503. Since an address of data allocated in the bank 1 for the master A 300 can be calculated from an address of data allocated in the bank 0 for the master A 300, a next command of the master A 300 for the bank 1 can be generated in master A command generation step S503.

Following this, the command selected in command arbitration step S501 and the command generated in master A command generation step S503 are transferred to the issuance unit 307 in command transfer step S507. The two commands transferred to the issuance unit 307 are consecutively issued to the storage apparatus 308 in command issuance step S507. These commands consecutively issued to the storage apparatus 308 in command issuance step S507 are a command for the bank 0 and a command for the bank 1.

After the two commands of the master A, namely, the command selected in command arbitration step S500 and the command generated in master A command generation step S503, are transferred to the issuance unit 307 in command transfer step S507, new arbitration is performed between commands of the three masters according to the procedure shown in FIG. 5 again, to select a next command.

The judgment as to whether or not the selected command is a command of the master A 300 is made in master A command judgment step S502. When the selected command is a command of the master B 301, that is, when the selected command is not a command of the master A 300, the operation proceeds to master B command judgment step S504. Since the selected command is a command of the master B 301, the operation proceeds to master B command generation step S505 to generate a next command of the master B 301 for the bank 1. Following this, the command selected in command arbitration step S501 and the command generated in master B command generation step S505 are transferred to the issuance unit 307 in command transfer step S507.

The two commands transferred to the issuance unit 307 are consecutively issued to the storage apparatus 308 in command issuance step S507. These commands consecutively issued to the storage apparatus 308 in command issuance step S507 are a command for the bank 0 and a command for the bank 1, too.

In the case where the commands of the master A and the commands of the master B are consecutively issued to the storage apparatus 308 in command issuance step S508, banks corresponding to the issued commands are in the order of the bank 0, the bank 1, the bank 0, the bank 1. Since the bank 0 and the bank 1 are alternately accessed in this way, a switching time required for a row address change can be concealed.

As described above, according to this embodiment, the arbitration unit 306 arbitrates commands for the bank 0 in the storage apparatus 308, which are issued from the master A 300, the master B 301, and the master C 302 that asynchronously issue only commands for the bank 0 and corresponding addresses for the bank 1 are calculable from their commands for the bank 0, and generates a command for the bank 1 corresponding to a selected command for the bank 0. The two commands of one of the master A 300, the master B 301, and the master C 302 are then consecutively issued to the storage apparatus 308. This allows a switching time required for a row address change to be concealed.

The second embodiment describes the case where the storage apparatus includes two banks and a command issued by each of the three masters corresponds to one bank. However, even in the case where the storage apparatus includes four banks and a command issued by each of the three masters corresponds to two banks, when a transfer size of one command to each bank is too small to conceal a switching time required for a row address change, the same effect as above can be achieved by generating, in the arbitration unit, a command for the bank 2 and the bank 3 from a command for the bank 0 and the bank 1 and consecutively issuing the two commands of the same master to the storage apparatus.

Third Embodiment

The following describes a command processing apparatus in a third embodiment.

Figure 6:
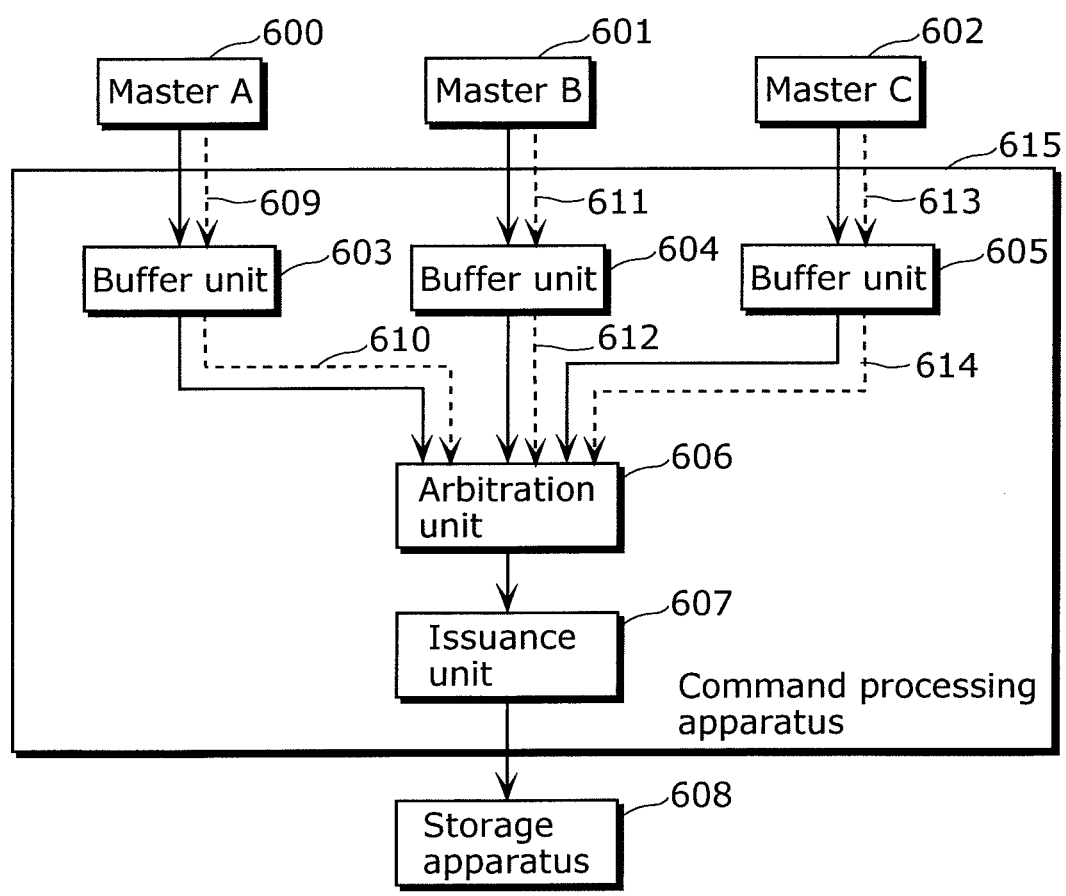
FIG. 6 is a block diagram showing one example of a functional structure of a command processing apparatus in a third embodiment.

FIG. 6 is a block diagram showing one example of a functional structure of a command processing apparatus 615 in the third embodiment. The command processing apparatus 615 is a command processing apparatus that processes commands which are issued asynchronously from a master A 600, a master B 601, and a master C 602 to a storage apparatus 608 including a plurality of banks (for example, a bank 0 and a bank 1). The command processing apparatus 615 includes buffer units 603, 604, and 605, an arbitration unit 606, and an issuance unit 607.

In the third embodiment, data to be accessed by each of the master A 600, the master B 601, and the master C 602 is distributed between the bank 0 and the bank 1 in the storage apparatus 608. Each of the master A 600, the master B 601, and the master C 602 may access only one of the bank 0 and the bank 1, or consecutively access both the bank 0 and the bank 1.

When accessing only one of the bank 0 and the bank 1 in the storage apparatus 608, the master A 600 issues a command to the arbitration unit 606, and does not assert consecutive selection request signals 609 and 610. When consecutively accessing the bank 0 and the bank 1 in the storage apparatus 608, the master A 600 issues a command to the arbitration unit 606, and asserts the consecutive selection request signals 609 and 610.

Likewise, when accessing only one of the bank 0 and the bank 1 in the storage apparatus 608, the master B 601 and the master C 602 issue a command to the arbitration unit 606, and do not assert consecutive selection request signals 611 and 612 and consecutive selection request signals 613 and 614, respectively. When consecutively accessing the bank 0 and the bank 1 in the storage apparatus 608, the master B 601 and the master C 602 issue a command to the arbitration unit 606, and assert the consecutive selection request signals 611 and 612 and the consecutive selection request signals 613 and 614, respectively.

These consecutive selection request signals are each an indication signal indicating whether or not the master further issues, following the command, a command for accessing another bank.

Figure 7:
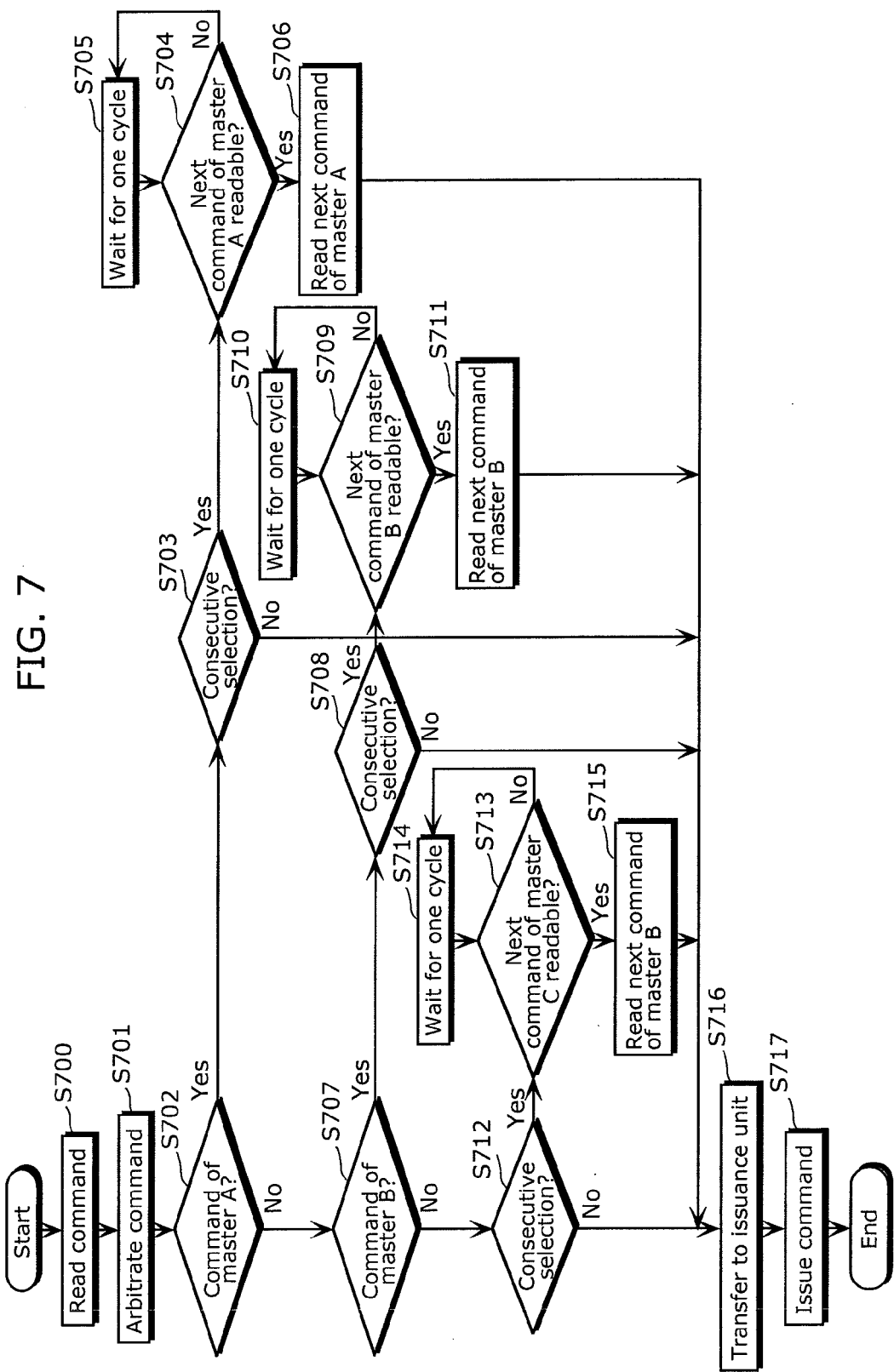
FIG. 7 is a flowchart showing an operation of the command processing apparatus in the third embodiment.

FIG. 7 is a flowchart showing command processing performed by the command processing apparatus 615 in the third embodiment.

This flowchart shows a procedure from when commands issued from the master A 600, the master B 601, and the master C 602 have been obtained respectively by the buffer units 603, 604, and 605 to when the commands are transferred to the storage apparatus 608.

The arbitration unit 606 reads the commands from the buffer units 603, 604, and 605 (S700), and arbitrates the read commands to thereby select a command relating to one master (S701). Though the present invention is not limited to a specific method of the arbitration, the arbitration may be performed according to a well-known round robin method as one example.

When the command of the master A 600 is selected as a result of the arbitration (S702: Yes), the arbitration unit 606 judges whether or not the consecutive selection request signal 610 from the master A 600 is asserted (S703).

When the consecutive selection request signal 610 is asserted (S703: Yes), the arbitration unit 606 waits until a next command of the master A 600 becomes readable (S704 to S705), and reads the next command of the master A 600 from the buffer unit 603 (S706).

When the command of the master B 601 is selected as a result of the arbitration (S707: Yes), the arbitration unit 606 judges whether or not the consecutive selection request signal 612 from the master B 601 is asserted (S708).

When the consecutive selection request signal 612 is asserted (S708: Yes), the arbitration unit 606 waits until a next command of the master B 601 becomes readable (S709 to S710), and reads the next command of the master B 601 from the buffer unit 604 (S711).

When neither the command of the master A 600 nor the command of the master B 601 but the command of the master C 602 is selected as a result of the arbitration (S707: No), the arbitration unit 606 waits until a next command of the master C 602 becomes readable (S713 to S714), and reads the next command of the master C 602 from the buffer unit 605 (S715).

The arbitration unit 606 transfers the command selected as a result of the arbitration in command arbitration step S701 and, in the case where a command is read in one of master A command reading step S706, master B command reading step S711, and master C command reading step S715, the read command to the issuance unit 607 (S716). The issuance unit 607 issues the command or commands transferred from the arbitration unit 606, to the storage apparatus 608 (S717).

A specific example of an operation of the command processing apparatus in this embodiment with the above structure is described in detail below.

First, the master A 600, the master B 601, and the master C 602 asynchronously issue commands to the storage apparatus 608. The command issued by the master A 600 is temporarily stored in the buffer unit 603, the command issued by the master B 601 is temporarily stored in the buffer unit 604, and the command issued by the master C 602 is temporarily stored in the buffer unit 605.

The arbitration unit 606 reads the commands stored in the buffer units 603 to 605 in command reading step S700, and arbitrates the commands of the three masters in command arbitration step S701, thereby selecting a command of one master.

The judgment as to whether or not the selected command is a command of the master A 600 is made in master A command judgment step S702. When the selected command is a command of the master A 600, the operation proceeds to consecutive selection judgment step S703 to judge whether or not the consecutive selection request signal 610 from the master A is asserted. When the consecutive selection request signal 610 from the master A is judged as not asserted in consecutive judgment step S703, the selected command is transferred to the issuance unit 607 in command transfer step S716, and issued to the storage apparatus 608 in command issuance step S717. After the selected command is transferred to the issuance unit 607 in command transfer step S716, a next command is selected according to the procedure shown in FIG. 7 again.

Arbitration is performed between commands of the three masters in command arbitration step S701 again, to select a next command.

The judgment as to whether or not the selected command is a command of the master A 600 is made in master A command judgment step S702, in the same way as the command which was selected first. When the selected command is not a command of the master A 600, the operation proceeds to master B command judgment step S707 to judge whether or not the selected command is a command of the master B 601. When the selected command is a command of the master B 601, the operation proceeds to consecutive judgment step S708 to judge whether or not the consecutive selection request signal 612 from the master B 601 is asserted.

When the consecutive selection request signal 612 from the master B 601 is judged as asserted, the operation proceeds to master B command readability judgment step S709. The judgment as to whether or not a next command of the master B 601 is readable is made in master B command readability judgment step S709. When the next command of the master B 601 is not readable, the operation proceeds to wait step S710 to wait for one cycle, and then proceeds again to master B command readability judgment step S709. Wait step S710 and master B command readability judgment step S710 are repeated until the next command of the master B 601 becomes readable.

When the next command of the master B 601 becomes readable, the operation proceeds to master B command reading step S711 to read the next command of the master B 601. The two commands of the master B 601, namely, the command selected in command arbitration step S701 and the command read in master B command reading step S711, are transferred to the issuance unit 607 in command transfer step S716. The two commands of the master B 601 transferred to the issuance unit 607 are then consecutively issued to the storage apparatus 608 in command issuance step S717. Here, since the master B 601 asserts the consecutive selection request signal 612, the two commands of the master B 601 are commands for different banks, i.e., the bank 0 and the bank 1.

After the two commands of the master B 601 are transferred to the issuance unit 607 in command transfer step S716, a next command is selected according to the procedure shown in FIG. 7 again.

Arbitration is performed between commands of the three masters in command arbitration step S701 again, to select a next command.

The judgment as to whether or not the selected command is a command of the master A 600 is made in master A command judgment step S702. When the selected command is not a command of the master A 600, the operation proceeds to master B command judgment step S707 to judge whether or not the selected command is a command of the master B 601. When the selected command is not a command of the master B 601, that is, when the selected command is a command of the master C 602, the operation proceeds to consecutive judgment step S712 to judge whether or not the consecutive selection request signal 614 from the master C 602 is asserted. When the consecutive selection request signal 614 from the master C 602 is judged as not asserted in consecutive judgment step S712, the selected command is transferred to the issuance unit 607 in command transfer step S716, and issued to the storage apparatus 608 in command issuance step S717.

A combination of banks corresponding to the command of the master A 600 which is the first command issued to the storage apparatus 608, the commands of the master B which are the second and third commands issued to the storage apparatus 608, and the command of the master C which is the fourth command issued to the storage apparatus 608 can fall in any of eight cases shown in FIG. 8, provided that the second and third issued commands of the master B 601 are commands for the bank 0 and the bank 1.

In case 1 and case 2 shown in FIG. 8, the bank 0 and the bank 1 are alternately accessed. Accordingly, switching times required for row address changes performed in the second access and the fourth access can all be concealed.

In case 3 and case 4 shown in FIG. 8, the bank 0 and the bank 1 are alternately accessed in the second access to the fourth access. Accordingly, though a switching time required for a row address change performed in the second access cannot be concealed, a switching time required for a row address change performed in the fourth access can be concealed.

In case 5 and case 6 shown in FIG. 8, the bank 0 and the bank 1 are alternately accessed in the first access to the third access. Accordingly, a switching time required for a row address change performed in the third access can be concealed, though a switching time required for a row address change performed in the fourth access cannot be concealed.

In case 7 and case 8 shown in FIG. 8, the same one of the bank 0 and the bank 1 is consecutively accessed. Accordingly, switching times required for row address changes performed in the second access and the fourth access cannot be concealed at all.

As described above, according to this embodiment, the master A 600, the master B 601, and the master C 602 which asynchronously issue commands to the storage apparatus 608 respectively assert the consecutive selection request signals 610, 612, and 614 when issuing commands for both the bank 0 and the bank 1, and the arbitration unit 606 consecutively selects commands of a master that asserts a corresponding one of the consecutive selection request signals 610, 612, and 614. As a result, a switching time required for a row address change can be concealed in the six cases out of the eight cases of the possible combinations of banks corresponding to these commands and their preceding and succeeding commands. Thus, a probability of concealing a switching time required for a row address change can be improved.

The third embodiment describes the case where the storage apparatus includes two banks and a command issued by each of the three masters corresponds to one bank. However, even in the case where the storage apparatus includes four banks and a command issued by each of the three masters corresponds to two banks, when a transfer size of one command to each bank is too small to conceal a switching time required for a row address change, the same effect as above can be achieved by asserting a consecutive selection request signal when issuing both a command for the bank 0 and the bank 1 and a command for the bank 2 and the bank 3, and consecutively selecting these commands in the arbitration unit.

The first to third embodiments describe the case where the three masters access the storage apparatus, but the number of masters which access the storage apparatus is not limited to three.

The first to third embodiments describe the case where the storage apparatus includes two banks or four banks, but the number of banks in the storage apparatus is not limited to two or four.

The first to third embodiments describe the case where all of the three masters perform the same type of access. However, the same effect can be achieved, though to a lesser extent, even when the operation described in each of the first to third embodiments is applied to only at least one of the three masters.

The same effect as in the first to third embodiments can also be attained by combining the command processing methods of the first to third embodiments.

The command processing apparatus described in each of the first to third embodiments may be realized by an integrated circuit apparatus that includes circuit blocks having functions of the structural units included in the command processing apparatus.

INDUSTRIAL APPLICABILITY

The command processing apparatus according to the present invention is useful as an arbitration circuit for a storage apparatus including a plurality of banks.

The invention claimed is:

1. A command processing apparatus, comprising:
a command processor that includes a plurality of buffers, the plurality of buffers obtaining commands which are issued asynchronously from a first master and a second master, the command processor processing and sequentially issuing the commands to a storage apparatus including a plurality of banks,
wherein, when the first master requests consecutive selection and issues a first command and a second command to one of the plurality of buffers, and the second master issues a third command to another of the plurality of buffers, the command processor consecutively issues the first command to the storage apparatus and the second command to the storage apparatus, and
the consecutive selection request by the first master requests consecutive issuance of the first command and the second command to the storage apparatus.

2. The command processing apparatus according to claim 1,
wherein the first command and the second command are for accessing different ones of the banks.

3. The command processing apparatus according to claim 1,
wherein the first command is a command for accessing luminance data of an image, and
the second command is a command for accessing chrominance data of the image.

4. The command processing apparatus according to claim 1,
wherein the first command is a command for accessing color component data of graphics data, and
the second command is a command for accessing any one of transparency data, stencil data, and depth data of the graphics data.

5. The command processing apparatus according to claim 1,
wherein the first master requests the consecutive selection with a consecutive selection request signal.

6. A command processing apparatus, comprising:
a command processor that includes a plurality of buffers, the plurality of buffers obtaining commands which are issued asynchronously from a first master and a second master, the command processor processing and sequentially issuing the commands to a storage apparatus including a plurality of banks,
wherein, when the first master requests consecutive selection and issues a first command and a second command to one of the plurality of buffers, and the second master issues a third command to another of the plurality of buffers, the command processor performs one of the following: consecutively issuing the first command to the storage apparatus and the second command to the storage apparatus and subsequently issuing the third command to the storage apparatus; and issuing the third command to the storage apparatus and subsequently consecutively issuing the first command to the storage apparatus and the second command to the storage apparatus, and
the consecutive selection request by the first master requests consecutive issuance of the first command and the second command to the storage apparatus.

7. The command processing apparatus according to claim 6,
wherein the first command and the second command are for accessing different ones of the banks.

8. The command processing apparatus according to claim 6,
wherein the first command is a command for accessing luminance data of an image, and
the second command is a command for accessing chrominance data of the image.

9. The command processing apparatus according to claim 6,
wherein the first command is a command for accessing color component data of graphics data, and
the second command is a command for accessing any one of transparency data, stencil data, and depth data of the graphics data.

10. The command processing apparatus according to claim 1, wherein said command processor is configured to consecutively issue the first command and the second command to different banks of the storage apparatus.

11. The command processing apparatus according to claim 6, wherein said command processor is configured to consecutively issue the first command and the second command to different banks of the storage apparatus.

12. The command processing apparatus according to claim 1, wherein each master is configured to issue a command for accessing a bank of the storage apparatus different from a bank of the storage apparatus accessed by an immediately preceding command issued by the master.

13. The command processing apparatus according to claim 6, wherein each master is configured to issue a command for accessing a bank of the storage apparatus different from the bank of the storage apparatus accessed by an immediately preceding command issued by the master.

14. The command processing apparatus according to claim 1, wherein said command processor judges whether the second command is readable before consecutively issuing the first command to the storage apparatus and the second command to the storage apparatus.

15. The command processing apparatus according to claim 14, wherein said command processor waits one cycle before consecutively issuing the first command to the storage apparatus and the second command to the storage apparatus when said command processor judges that the second command is not readable.

16. The command processing apparatus according to claim 15, wherein said command processor repeatedly judges whether the second command is readable and waits the one cycle until the second command becomes readable before consecutively issuing the first command to the storage apparatus and the second command to the storage apparatus.

17. The command processing apparatus according to claim 6, wherein said command processor judges whether the second command is readable before consecutively issuing the first command to the storage apparatus and the second command to the storage apparatus.

18. The command processing apparatus according to claim 17, wherein said command processor waits one cycle before consecutively issuing the first command to the storage apparatus and the second command to the storage apparatus when said command processor judges that the second command is not readable.

19. The command processing apparatus according to claim 18, wherein said command processor repeatedly judges whether the second command is readable and waits the one cycle until the second command becomes readable before consecutively issuing the first command to the storage apparatus and the second command to the storage apparatus.

20. A command processing apparatus, comprising:
a plurality of buffers that obtains commands which are issued asynchronously from a plurality of masters;
an arbitrator that reads the commands from the plurality of buffers and arbitrates the commands for sequential issuance to a storage;
wherein the arbitrator consecutively obtains and issues a first command and a second command from one of the plurality of buffers in response to receiving a consecutive selection request signal, the consecutive selection request signal being received by the arbitrator in association with the first command, the first command and the second command each being obtained by the one of the plurality of buffers from a first master of the plurality of masters.

* * * * *